UNITED STATES PATENT OFFICE.

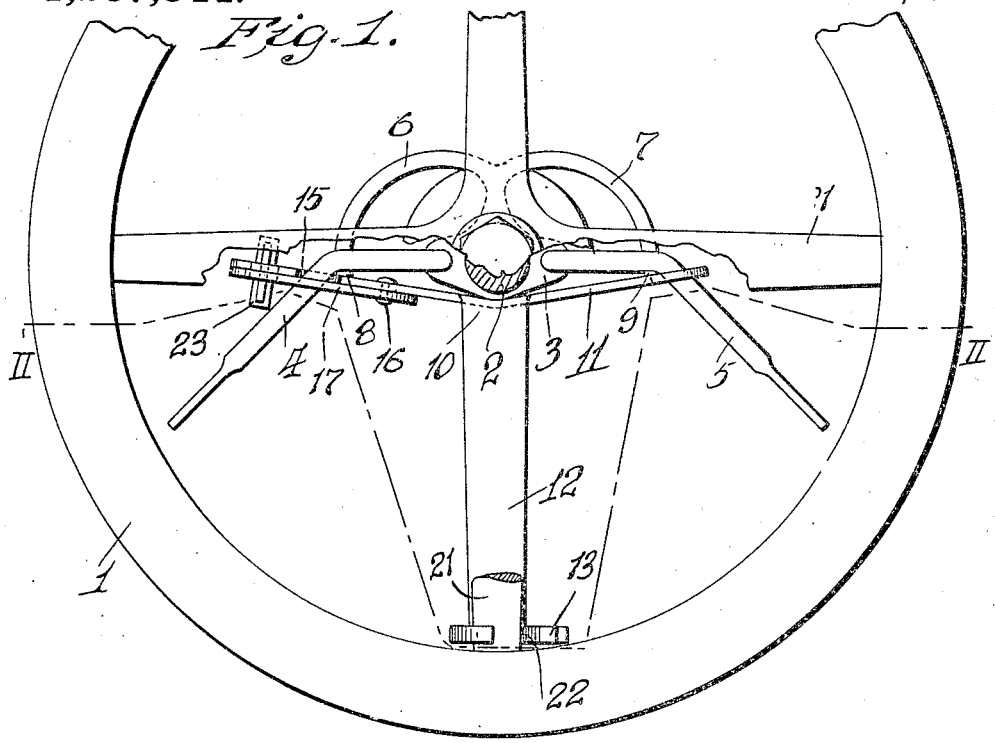
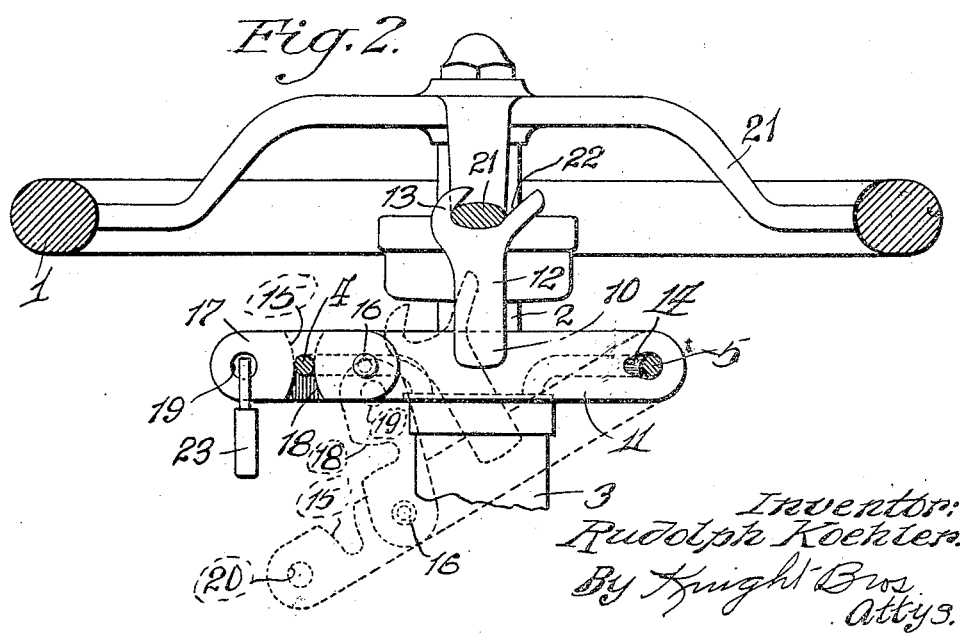

RUDOLPH KOEHLER, OF ST. LOUIS, MISSOURI.

LOCKING DEVICE.

1,287,344.  Specification of Letters Patent. Patented Dec. 10, 1918.

Application filed November 20, 1915. Serial No. 62,468.

*To all whom it may concern:*

Be it known that I, RUDOLPH KOEHLER, a citizen of the United States of America, residing in the city of St. Louis and State of Missouri, have invented certain new and useful Improvements in Locking Devices for Locking the Motor-Control Levers of the Engine and Steering-Gear of an Automobile Together, of which the following is a specification.

This is a companion application to my application for Letters Patent on locking devices pertaining to automobiles which is executed of even date herewith, the aforesaid application pertaining to the construction of a foldable locking device whereas the present application pertains to a locking device of a solid structure.

The primary object of this invention is to provide a locking device that is applicable to the steering wheel of an automobile which when set in a position of locking will securely grip the engine control levers, commonly known as the carbureter lever and the spark control lever, and also the steering wheel in a set immovable position.

It is known that there are devices now in use that are adapted to lock the engine control levers against being moved, but it has been found that one familiar with the workings of the engine of an automobile can very quickly adjust things relatively to the parts controlled by the aforesaid engine control levers so that they can start the motor, and inasmuch as the steering wheel is not locked, the unlawful operator can drive the automobile away.

The main theme of this invention therefore is to provide a locking device that will securely hold the engine control levers and steering wheel against movement.

Other and further objects will appear in the specification, and be specifically pointed out in the appended claims, reference being had to the accompanying drawings exemplifying the invention, and in which, Figure 1 is a fragmentary plan view of the steering wheel of an automobile showing the engine control levers, this improved locking device being locked to the wheel and levers.

Fig. 2 is a sectional elevation taken on the line II—II of Fig. 1.

Referring by numerals to the accompanying drawings, 1 designates a steering wheel which is mounted to the upper end of the steering post 2, said post being mounted in the post support 3. Operatably mounted in the post support 3 is a carbureter control lever 4 and a spark control lever 5, said levers are mounted on the respective quadrants 6 and 7, and are adapted to abut stops 8 and 9 respectively when they are moved into their inactive positions.

The figures in the drawing show the locking device 10 in a position of locking said locking device comprising a horizontally arranged portion 11 and leading upwardly and outwardly from the central portion thereof is an engaging arm 12, the upper end of said arm 12 being bifurcated as shown at 13. Formed adjacent one end of the horizontally arranged portion 11 is an elongated opening 14, and formed adjacent the opposite end of said portion 11 is a recess 15, said recess opening upwardly in the direction as the bifurcated portion 13, of the arm 12.

Pivotally mounted at 16 adjacent the recess 15 is a closing plate 17, said plate having a recess 18 which is oppositely disposed relative to the recess 15. Formed in the outer end of the plate 17 is an opening 19, said opening being adapted to be placed in alinement with the opening 20 which is formed in the horizontal portion 11 adjacent the recess 15.

In the operation of this improved locking device, when it is desired to lock the steering wheel 1 and the control levers 4 and 5, the locking device 10 is engaged and the elongated opening 14 thereof is mounted over the outer end of the spark control lever 5. Then the locking device is moved into the approximate angle as shown by dotted lines in Fig. 2, and from there is adapted to be swung upwardly. the lever 5 serving as a pivot. It is of course to be understood that at the time of locking, the control levers 4 and 5 are to abut their respective stops 8 and 9 and it is also essential that one of the spokes 21 of the steering wheel 1 to be placed in a position approximately midway between the ends of the levers 4 and 5, or in other words, have one of the spokes arranged longitudinal of the automobile.

The closure plate 17 which is pivotally mounted at 16 to the horizontal portion 11 is turned upwardly so that said plate will pass the handle of the carbureter lever 4, as the locking device is moved upwardly, and as the locking device is brought into an approximate horizontal position, the recess 15 thereof will engage the underside of the handle portion of the carbureter lever 4, and the intermediate portion of the horizontal portion 11 will bear against the upper end of the post support 3. As the locking device was being swung upwardly as just related, the recess 22 which is formed in the bifurcated portion 13 of the arm 12 will be brought in engagement against the underside of the longitudinally arranged spoke 21 of the steering wheel. This engagement of the bifurcated portion 13 of the arm 12 against the spoke 21 will take place simultaneously with the engagement of the recess 15 against the underside of the carbureter lever 4. The closure plate 17 is then moved downwardly until the opening 19 thereof is in alinement with the opening 20 which is formed in the horizontal portion 11. The loc 3 is then inserted in said openings 19 and 0 and inasmuch as the recess 18 of the plate 17 is oppositely disposed to the recess 15 of the horizontal portion 11, the locking device will be held immovable so that the control levers 4 and 5 cannot be manipulated, and the bifurcated portion 13 of the arm 12 straddling the spoke 21 will also hold the steering wheel 1 against movement.

In constructing this improved locking device, it is preferable to make the slot 22 of the bifurcated portion 13 curved so that the locking device after having one end engaged on the spark control lever 5 can be swung upwardly, the handle of the lever 5 serving as a pivot thereto so that the slotted portions 15 and 22 will engage the carbureter lever 4 and spoke 21 respectively.

This device when not in operation is entirely removed from adjacent the parts which it is adapted to lock. When this improved locking device is in its locked position relative to the steering wheel and engine control levers, it is preferable to have the side of the horizontal portion 11 abut against the stops 8 and 9 so that the same will be securely held in place.

What I claim is

1. In combination with the steering post, steering wheel, and the controlling levers governing the supply of gasolene and the ignition systems of a vehicle, a body adapted to abut said steering post and having a portion to engage one of said levers, means for engaging a portion of said steering wheel, and a lock to secure the other lever and the body portion together.

2. An automobile lock comprising a locking bar adapted to bear against one side of a steering shaft, said locking bar having means at one end for engaging one of the levers on one side of said steering shaft, means at the other end of said locking bar for engaging the other lever on the other side of the steering shaft, and means intermediate of the ends of said locking bar for engaging a portion of the steering wheel of said steering shaft.

3. In combination, a steering wheel, a pair of engine control levers and a locking device for said wheel and said levers, an engaging portion formed in said locking device for the reception of one of said levers, a recess formed in said locking device for the reception of the other said lever, a wheel engaging portion formed on said locking device, said locking device adapted to be swung from one of said levers so that said recess will engage the other said lever, said wheel engaging portion adapted to be engaged against said wheel, when said recess is engaging said lever and means for locking said device to said levers and against said wheel.

4. In combination, a steering wheel, a pair of engine control levers and a locking device, said locking device comprising a body portion, an opening formed in one end of said body portion, a recess formed in the opposite end of said body portion, an upwardly extending portion formed intermediate of the ends of said body portion, said locking device being capable of having one end mounted over one end of one of said levers so that said device can be swung into a position so that the recess thereof will engage against the other said lever, said upwardly extending portion adapted to engage a portion of said steering wheel and a closure plate mounted on said body portion adapted to clamp said recessed lever in said recess.

5. A lock for locking the steering wheel of a vehicle and levers which extend from the opposite sides of the steering shaft, comprising a locking bar adapted to bear against one side of the steering shaft, an engaging portion formed on said locking bar for engagement with a portion of said wheel, and means at each end of the locking bar for engaging the respective levers, one of said means being a lock.

6. The combination with pivoted levers, a steering wheel, and a segment coöperating therewith, of an arm provided near one end with an apertured head to receive one lever therethrough, and having a part adapted to engage with the segment whereby its inward movement is limited, a projecting portion extending from said arm for engagement with a portion of said steering wheel, and lock means to detachably connect the opposite end of the arm with the other lever.

7. The combination with an automobile steering gear including a steering column, a steering wheel and two control levers, of a lock-bar formed at one end to receive and retain one of the control-levers and at the other end to embrace the other control-lever and having a cross portion forked at one end to embrace a spoke of the steering wheel and designed at the other end to bear against the steering column to prevent disengagement of the spoke engaging end, and locking means for locking the embraced control-lever fast with its related lock-bar end, whereby to lock both the control-levers in closed position against service movement and the steering wheel against turning movement.

RUDOLPH KOEHLER.